US012179385B2

(12) United States Patent
Kou et al.

(10) Patent No.: US 12,179,385 B2
(45) Date of Patent: Dec. 31, 2024

(54) ULTRASONIC GENERATION DEVICE AND CONCRETE FORMING SYSTEM

(71) Applicants: TAIYUAN UNIVERSITY OF TECHNOLOGY, Shanxi (CN); SHANXI LINGXUDA TECHNOLOGY CO., LTD, Shanxi (CN)

(72) Inventors: Ziming Kou, Shanxi (CN); Juan Wu, Shanxi (CN); Hulin Wang, Shanxi (CN); Qichao Ren, Shanxi (CN); Yanwei Peng, Shanxi (CN); Buwen Zhang, Shanxi (CN); Feng Yan, Shanxi (CN)

(73) Assignees: TAIYUAN UNIVERSITY OF TECHNOLOGY, Shanxi (CN); SHANXI LINGXUDA TECHNOLOGY CO., LTD, Shanxi (CN)

( * ) Notice: Subject to any disclaimer, the term of this patent is extended or adjusted under 35 U.S.C. 154(b) by 0 days.

(21) Appl. No.: 18/576,732

(22) PCT Filed: Jan. 10, 2023

(86) PCT No.: PCT/CN2023/071614

§ 371 (c)(1),
(2) Date: Jan. 4, 2024

(87) PCT Pub. No.: WO2023/216644

PCT Pub. Date: Nov. 16, 2023

(65) Prior Publication Data

US 2024/0286313 A1 Aug. 29, 2024

(30) Foreign Application Priority Data

May 10, 2022 (CN) ......................... 202210505691.5

(51) Int. Cl.
*B28C 5/48* (2006.01)

(52) U.S. Cl.
CPC ...................................... *B28C 5/48* (2013.01)

(58) Field of Classification Search
CPC .......... B28C 5/48; B01F 31/265; B01F 31/81; B01F 31/831
See application file for complete search history.

(56) References Cited

U.S. PATENT DOCUMENTS 3,870,282 A * 3/1975 Wadensten .............. B06B 1/186 415/92
6,244,815 B1 * 6/2001 Treat ......................... F01D 1/02 366/124

FOREIGN PATENT DOCUMENTS

CN 205926246 2/2017
CN 109201442 1/2019
(Continued)

OTHER PUBLICATIONS

Machine Translation of CN109201442, accessed via worldwide.espacenet.com on Jun. 26, 2024 (Year: 2018).*
(Continued)

*Primary Examiner* — Marc C Howell
(74) *Attorney, Agent, or Firm* — JCIPRNET

(57) ABSTRACT

An ultrasonic generation device and a concrete forming system are provided. The ultrasonic generation device includes a housing, a rotary vibration member, and a shaft body. The housing is provided with an air inlet. The rotary vibration member is disposed in the housing. The shaft body is relatively fixed to the housing, the rotary vibration member is sleeved on the shaft body, and the rotary vibration member and the shaft body are rotatable relative to each other. The shaft body is provided with a main air passage and a jet hole, a first end of the main air passage is in communication with the air inlet and a second end of the main air
(Continued)

passage is in communication with the jet hole, the jet hole is provided in the shaft body at a position corresponding to the rotary vibration member.

9 Claims, 10 Drawing Sheets

(56) References Cited

FOREIGN PATENT DOCUMENTS

| | | |
|---|---|---|
| CN | 112090716 | 12/2020 |
| CN | 114953191 | 8/2022 |
| EP | 2626145 | 8/2013 |

OTHER PUBLICATIONS

"International Search Report (Form PCT/ISA/210) of PCT/CN2023/071614," mailed on May 25, 2023, with English translation thereof, pp. 1-4.
"Written Opinion of the International Searching Authority (Form PCT/ISA/237) of PCT/CN2023/071614," mailed on May 25, 2023, with English translation thereof, pp. 1-10.

* cited by examiner

ULTRASONIC GENERATION DEVICE AND CONCRETE FORMING SYSTEM

CROSS-REFERENCE TO RELATED APPLICATION

This application is a 371 of international application of PCT application serial no. PCT/CN2023/071614, filed on Jan. 10, 2023, which claims the priority benefit of Chinese Patent Application No. 202210505691.5, filed on May 10, 2022 and entitled "ULTRASONIC GENERATION DEVICE AND CONCRETE FORMING SYSTEM". The entirety of each of the above mentioned patent applications is hereby incorporated by reference herein and made a part of this specification.

TECHNICAL FIELD

Embodiments of the present application relate to, but are not limited to, the field of material processing, and in particular, to an ultrasonic generation device and a concrete forming system.

BACKGROUND

Vibrators are often configured for material processing such as concrete mixing and are usually driven by electricity or air flows. The working part of a vibrator is a rod-shaped hollow cylinder with an eccentric weight inside. The vibrator is driven by a motor to rotate at high speed and produce high-frequency and micro-amplitude vibrations.

Vibrators of eccentric, centrifugal, and reciprocating types are commonly used. These vibration modes will cause large cyclic loads on components, resulting in failure of bearings, breakage of screws, or damage to the components. For example, in a roller-type pneumatic vibrator, when compressed air of a certain pressure is injected via an inlet connector, the strong compressed air blows a roller on tracks and the roller rotates at high speed on the tracks to produce a vibration force. A pneumatic turbine vibrator is taken as another example, the structure of the vibrator includes an aluminum alloy housing molded by extrusion, an eccentric rotor is provided via a bearing inside the housing, and an air inlet and an exhaust hole are provided on the top of the housing. The pneumatic turbine vibrator can produce vibrations with periodically changing directions and constant excitation forces.

In the above solutions, due to the high-speed centrifugal rotation of the roller, the roller and the seat are greatly worn and need to be replaced periodically, resulting in complicated maintenance and limited use. As for the pneumatic turbine vibrator, the bearing receives huge cyclic vibrations and needs to be replaced periodically. Therefore, how to reduce equipment wear and increase service life has become a problem in urgent need of solutions.

SUMMARY

The ultrasonic generation device and the concrete forming system provided by the embodiments of the present application have the advantages of good wear resistance and a long service life.

In a first aspect, an embodiment of the present application provides an ultrasonic generation device, which includes a housing, a rotary vibration member, and a shaft body, wherein the housing is provided with an air inlet, the rotary vibration member is disposed in the housing and is configured for vibrating during rotation to generate ultrasonic waves, and the shaft body is relatively fixed to the housing; the rotary vibration member is sleeved on the shaft body, the rotary vibration member and the shaft body are rotatable relative to each other, the shaft body is provided with a main air passage and a jet hole, a first end of the main air passage is in communication with the air inlet and a second end of the main air passage is in communication with the jet hole, the jet hole is provided in the shaft body at a position corresponding to the rotary vibration member, and the jet hole is configured for ejecting an air flow to form an air film between the rotary vibration member and the shaft body.

In the ultrasonic generation device provided by the embodiment of the present application, the air inlet on the housing is connected to an air supply device and is configured for introducing a high-pressure air flow into the housing. The shaft body is relatively fixed in the housing, the rotary vibration member is sleeved on the shaft body, and the shaft body positions the rotary vibration member. The rotary vibration member is forced to rotate by the air flow and vibrates during rotation to generate ultrasonic waves. The shaft body is provided with the main air passage and the jet hole and the first end of the main air passage is in communication with the air inlet, so that a part of the air flow introduced by the air inlet enters the main air passage. The second end of the main air passage is in communication with the jet hole, the jet hole is provided in the shaft body at a position corresponding to the rotary vibration member, and the jet hole is configured for ejecting an air flow to form an air film between the rotary vibration member and the shaft body. The air film separates the rotary vibration member from the shaft body by air suspension. Hence, the rotary vibration member is suspended about the shaft body, so that the friction between the rotary vibration member and the shaft body is greatly reduced, the wear of the rotary vibration member is reduced accordingly, and the service life of the device is increased. Compared with the solutions in the related art in which components are prone to wear under heavy loads, the ultrasonic generation device in the present application is provided with the jet hole to form an air film between the rotary vibration member and the shaft body, so that the friction between the rotary vibration member and the shaft body is reduced, the wear of the components is reduced, and the service life of the device is increased.

In a possible implementation of the present application, a plurality of jet holes are provided and are evenly distributed along a circumference of the shaft body.

In a possible implementation of the present application, an axis of each of the jet holes is along a radial direction of the shaft body.

In a possible implementation of the present application, an air inlet assembly is provided at a first end of the shaft body, the air inlet assembly includes an air inlet end cover, the first end of the shaft body is inserted into the air inlet end cover, a first air guide hole is provided in the air inlet end cover, and the first air guide hole communicates the main air passage with the air inlet of the housing.

In a possible implementation of the present application, a guide ring is disposed on a side of the air inlet end cover close to the rotary vibration member, a second air guide hole is provided in the guide ring, and the second air guide hole guides the air flow from the air inlet to the rotary vibration member, to push the rotary vibration member to rotate.

In a possible implementation of the present application, an annular first airflow passage is formed between the air inlet end cover and an inner wall of the housing, and the first air guide hole and the second air guide hole are in communication with the air inlet via the first airflow passage.

In a possible implementation of the present application, a plurality of second air guide holes are provided and are arranged in a circular array about a central axis of the guide ring.

In a possible implementation of the present application, two ends of each of the second air guide holes are respectively provided on two side surfaces of the guide ring, and each of the second air guide holes extends helically along an axial direction of the guide ring.

In a possible implementation of the present application, a plurality of first air guide holes are provided and are evenly distributed along a circumference of the air inlet end cover.

In a possible implementation of the present application, a pressure-retaining assembly is provided at a second end of the shaft body, and the pressure-retaining assembly is configured for balancing air pressure on two sides of the rotary vibration member to realize axial positioning of the rotary vibration member.

In a possible implementation of the present application, the pressure-retaining assembly includes a pressure-retaining exhaust ring, a periphery of the pressure-retaining exhaust ring is connected to the inner wall of the housing, the pressure-retaining exhaust ring is sleeved on the shaft body, and a second airflow passage is formed between the pressure-retaining exhaust ring and the shaft body.

In a possible implementation of the present application, an elastic pressure-retaining plate is disposed on a side of the pressure-retaining exhaust ring away from the rotary vibration member, the elastic pressure-retaining plate is sleeved on the shaft body and is fixedly connected to the shaft body, the elastic pressure-retaining plate is provided with elastic air outlets, and a size of each of the elastic air outlets changes with the air pressure in the housing.

In a second aspect, an embodiment of the present application provides a concrete forming system, which includes a concrete mixer, an air supply device, and the ultrasonic generation device as described in the first aspect, wherein the ultrasonic generation device is disposed on the concrete mixer and configured for vibration forming of concrete in the concrete mixer; and the air supply device is configured for providing the ultrasonic generation device with purified air.

The concrete forming system provided by the embodiment of the present application includes the ultrasonic generation device as described in the first aspect and thus achieves the same technical effect. That is, the jet hole in communication with the air inlet on the housing is provided to form an air film between the rotary vibration member and the shaft body, so that the friction between the rotary vibration member and the shaft body is reduced, the wear of the components is reduced, and the service life of the device is increased.

REFERENCE SIGNS

Figure 1:
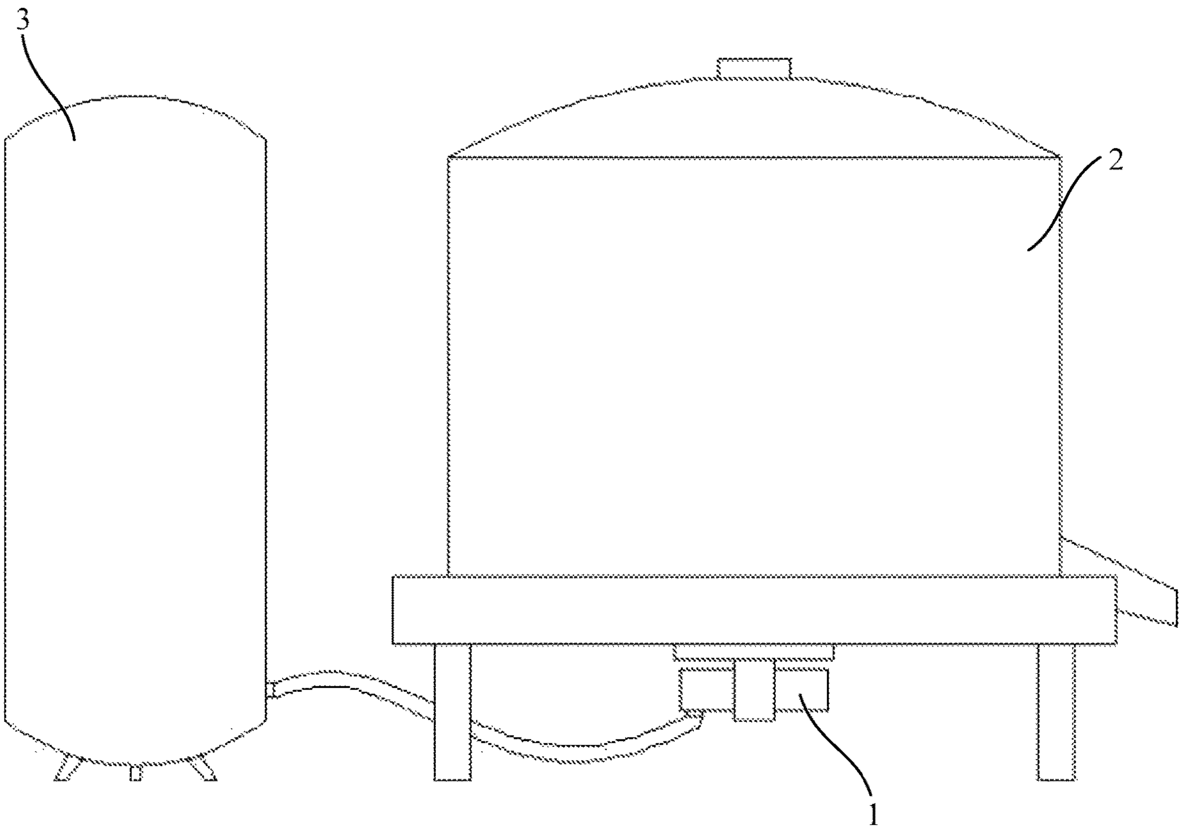
FIG. 1 is a schematic structural diagram of a concrete forming system provided by an embodiment of the present application.

1. ultrasonic generation device: 11. housing: 111. air inlet; 112. fixing portion; 12. rotary vibration member; 121. mounting sleeve; 122. elastic blade: 13. shaft body; 131. main air passage; 132. jet hole; 14. air inlet assembly; 141. air inlet end cover; 1411. sealing portion; 1412. air guide portion: 1413. first air guide hole: 142. guide ring: 1421. second air guide hole; 15. first airflow passage: 16. pressure-retaining assembly: 161. pressure-retaining exhaust ring: 1611. second airflow passage; 162. connector; 163. elastic pressure-retaining plate; 1631. pressure-retaining plate body: 1632. elastic portion; 1633. elastic air outlet; 17. silencer end cover; 171. third air guide hole; 18. elastic stop ring: 19. mounting base; 191. fixed bottom plate; 192. movable hoop; 1921. fixed block; 1922. movable block; 2. concrete mixer; 3. air supply device.

DETAILED DESCRIPTION OF THE EMBODIMENTS

In order to make the objectives, technical solutions, and advantages of the embodiments of the present application clearer, the technical solutions of the present application are further described in detail below with reference to the accompanying drawings of the embodiments of the present application. The following embodiments are for illustration, instead of limiting the scope of the present application.

In the embodiments of the present application, terms "first" and "second" are merely used for the purpose of description, and cannot be understood as indicating or implying relative importance or implicitly indicating the number of denoted technical features. Therefore, a feature defined by "first" or "second" explicitly or implicitly includes one or more such features. In the description of the embodiments of the present application, "a plurality of" means two or above two, unless otherwise stated.

In addition, in the embodiments of the present application, terms of directions such as "upper", "lower", "left", and "right" are defined in accordance with the arrangement of the components in the accompanying drawings. It should be understood that these terms of directions as relative concepts are used for relative description and clarification and can change accordingly with the arrangement of the components in the accompanying drawings.

In the embodiments of the present application, unless otherwise expressly specified and defined, the term "connection" should be understood in a broad sense. For example, "connection" can be a fixed connection, a detachable connection, or an integral connection and can be a direct connection or an indirect connection through an intermediary.

In the embodiments of the present application, the terms "include", "contain", or any other variations thereof are intended to cover a non-exclusive inclusion, so that a process, method, article, or apparatus including a series of elements not only includes those elements, but also includes other elements not expressly listed or elements inherent to this process, method, article, or apparatus. Without further limitations, an element defined by the statement "includes a . . . " does not preclude the presence of other identical elements in the process, method, article, or apparatus including the element.

In the embodiments of the present application, words such as "exemplary" or "for example" are used to present examples, illustrations, or explanations. Any embodiment or design preceded by "exemplary" or "for example" in the embodiments of the present application shall not be construed as preferred or advantageous over other embodiments or designs. Rather, the words such as "exemplary" or "for example" are intended to present related concepts in a specific way.

An embodiment of the present application provides a concrete forming system, which mainly adopts a vibrating machine to process concrete materials, so that the fluidity of the materials is increased to facilitate concrete forming and the compactness of the concrete is also increased. Specifically, the vibrating machine transfers vibration energy of a certain frequency, amplitude, and excitation force to the concrete materials, which greatly reduces the adhesion and internal friction in the materials and makes the materials appear in a heavy liquid state. As the aggregates settle and are arranged under gravity, air in the concrete mixture is expelled and voids are eliminated, so that the aggregates are densely arranged and the cement paste is effectively filled.

Referring to FIG. 1, the concrete forming system provided by the embodiment of the present application includes a concrete mixer 2, an air supply device 3, and an ultrasonic generation device 1. The ultrasonic generation device 1 is disposed on the concrete mixer 2 and is configured for vibration forming of concrete in the concrete mixer 2. The air supply device 3 is configured for providing the ultrasonic generation device 1 with purified air.

Figure 2:
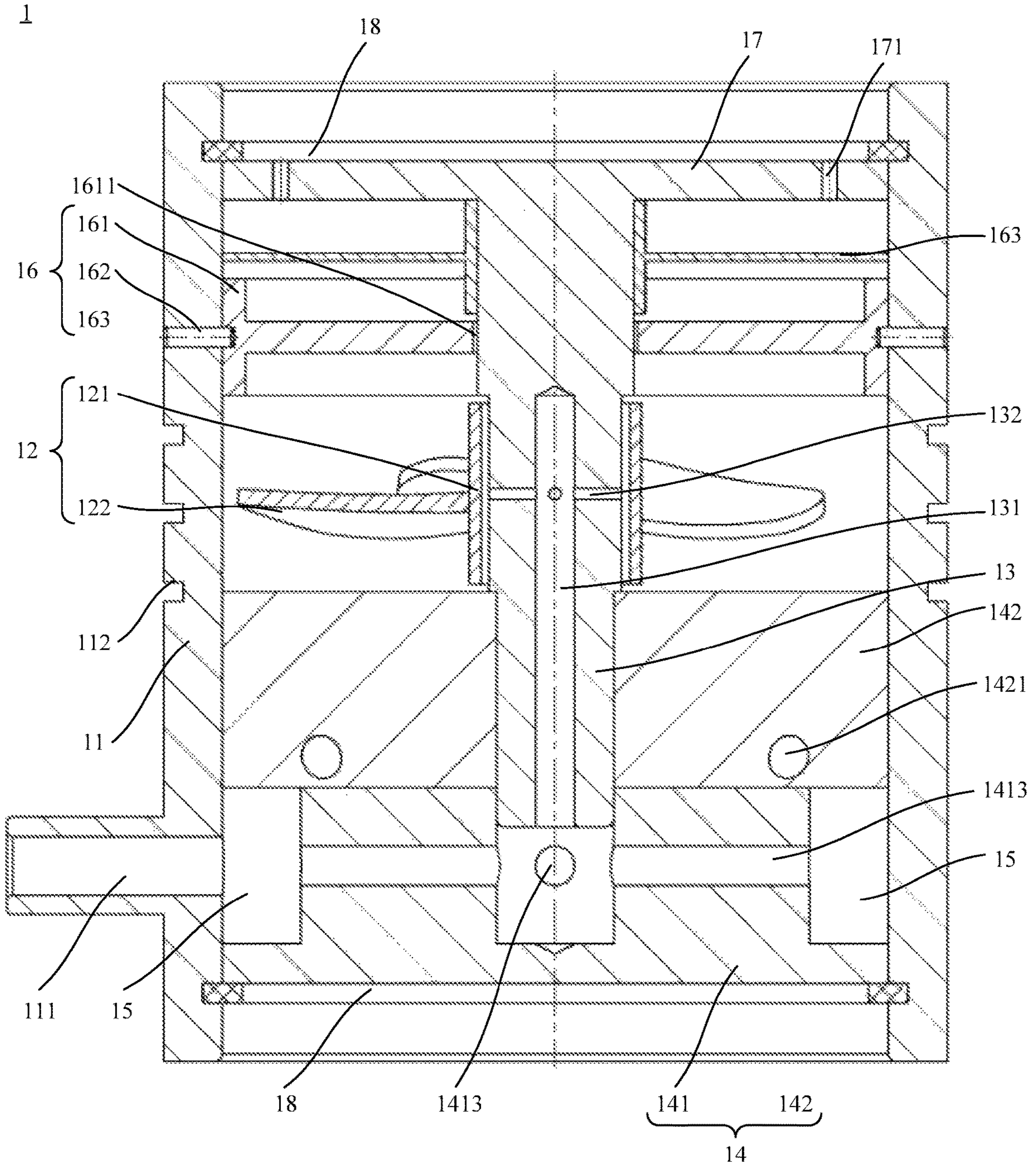
FIG. 2 is a schematic structural diagram along a section of an ultrasonic generation device provided by an embodiment of the present application.

On this basis, an embodiment of the present application provides the ultrasonic generation device 1. Referring to FIG. 2, the ultrasonic generation device 1 provided by the embodiment of the present application includes a housing 11, a rotary vibration member 12, and a shaft body 13. The housing 11 is provided with an air inlet 111. The rotary vibration member 12 is disposed in the housing 11 and is configured for vibrating during rotation to generate ultrasonic waves. The shaft body 13 is relatively fixed to the housing 11, the rotary vibration member 12 is sleeved on the shaft body 13, and the rotary vibration member 12 and the shaft body 13 are rotatable relative to each other. The shaft body 13 is provided with a main air passage 131 and a jet hole 132, a first end of the main air passage 131 is in communication with the air inlet 111 and a second end of the main air passage 131 is in communication with the jet hole

132, the jet hole 132 is provided in the shaft body 13 at a position corresponding to the rotary vibration member 12, and the jet hole 132 is configured for ejecting an air flow to form an air film between the rotary vibration member 12 and the shaft body 13.

In the ultrasonic generation device 1 provided by the embodiment of the present application, the air inlet 111 on the housing 11 is connected to the air supply device 3 and is configured for introducing a high-pressure air flow into the housing 11. The shaft body 13 is relatively fixed in the housing 11, the rotary vibration member 12 is sleeved on the shaft body 13, and the shaft body 13 positions the rotary vibration member 12. The rotary vibration member 12 is forced to rotate by the air flow and vibrates during rotation to generate ultrasonic waves. The shaft body 13 is provided with the main air passage 131 and the jet hole 132 and the first end of the main air passage 131 is in communication with the air inlet 111, so that a part of the air flow introduced by the air inlet 111 enters the main air passage 131. The second end of the main air passage 131 is in communication with the jet hole 132, the jet hole 132 is provided in the shaft body 13 at a position corresponding to the rotary vibration member 12, and the jet hole 132 is configured for ejecting an air flow to form an air film between the rotary vibration member 12 and the shaft body 13. The air film separates the rotary vibration member 12 from the shaft body 13 by air suspension. Hence, the rotary vibration member 12 is suspended about the shaft body 13, so that the friction between the rotary vibration member 12 and the shaft body 13 is greatly reduced, the wear of the rotary vibration member 12 is reduced accordingly, and the service life of the device is increased. Compared with the solutions in the related art in which components are prone to wear under heavy loads, the ultrasonic generation device 1 in the present application is provided with the jet hole 132 to form an air film between the rotary vibration member 12 and the shaft body 13, so that the friction between the rotary vibration member 12 and the shaft body 13 is reduced, the wear of the components is reduced, and the service life of the device is increased.

The shape of the housing 11 is, for example, prismatic, square, or cylindrical and is not limited in the present application. Referring to FIG. 2, in an embodiment of the present application, the housing 11 is cylindrical and air flows from one end to the other end of the housing 11 to drive the rotary vibration member 12 to move.

The position of the air inlet 111 is not limited in the present application. For example, the air inlet 111 is provided at one end of the housing 11 or the air inlet 111 is provided at the periphery of one end of the housing 11. Referring to FIG. 2, in an embodiment of the present application, the air inlet 111 is provided at the periphery of one end of the housing 11 and the air inlet 111 protrudes from the surface of the housing 11, which facilitates connection of the air inlet 111 to the air supply device 3.

Figure 3:
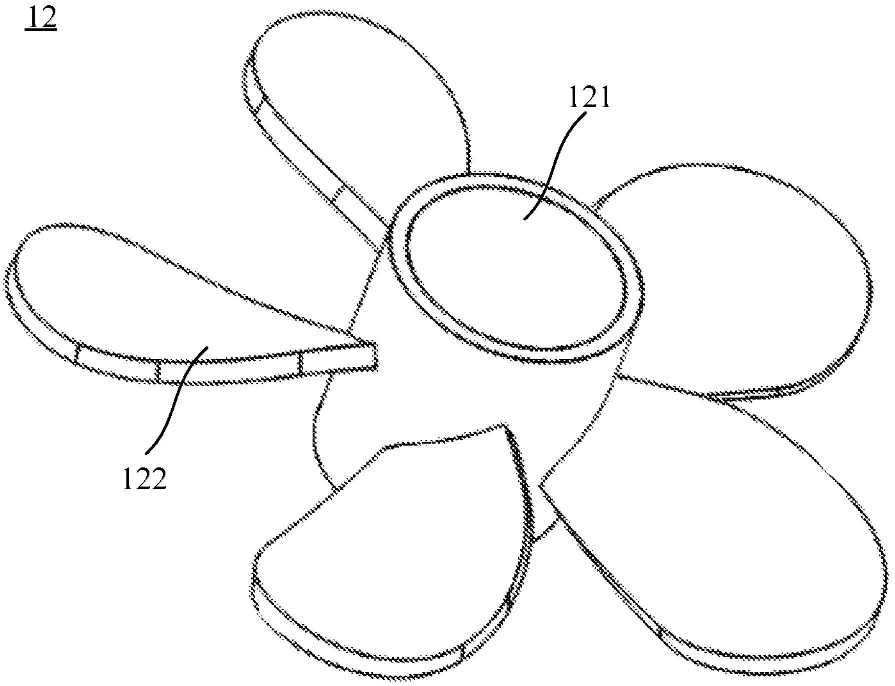
FIG. 3 is a schematic structural diagram of a rotary vibration member in the ultrasonic generation device provided by an embodiment of the present application.

It should be noted that the structure of the rotary vibration member 12 is not limited in the present application, and any structure capable of vibrating while rotating about the shaft body 13 falls within the protection scope of the present application. Referring to FIG. 3, in an embodiment of the present application, the rotary vibration member 12 includes a mounting sleeve 121 and a plurality of elastic blades 122. The inner diameter of the mounting sleeve 121 is larger than the outer diameter at the corresponding position of the shaft body 13, and the mounting sleeve 121 is fitted on the shaft body 13. The elastic blades 122 are fixedly connected at the periphery of the mounting sleeve 121 and are arranged in a circumferential array about the axis of the mounting sleeve 121. In addition, the elastic blades 122 are each arranged at an angle with the axis of the mounting sleeve 121, so that air flows through the elastic blades 122 to drive the rotary vibration member 12 to rotate.

It should be noted that the shape of the jet hole 132 is not limited in the present application, and the jet hole 132 can be a square or round hole and can be a constant-diameter or variable-diameter hole. Referring to FIG. 2, in an embodiment of the present application, the jet hole 132 is a round constant-diameter hole.

To make the rotary vibration member 12 receive more balanced forces, referring to FIG. 2, in an embodiment of the present application, a plurality of jet holes 132 are provided and are evenly distributed along the circumference of the shaft body 13. The jet holes 132 eject air flows in multiple directions to apply forces in multiple directions on the rotary vibration member 12, so that the forces received by the rotary vibration member 12 in radial directions are balanced and radial positioning of the rotary vibration member 12 is realized.

The axial direction, that is, the opening direction of each of the jet holes 132 is not limited in the present application. For example, the axis of each of the jet holes 132 forms an acute angle with the axis of the shaft body 13. The jet holes 132 are divided into two groups, the jet holes 132 in each of the groups are distributed annularly along the shaft body 13, and the two jet hole groups are symmetrically arranged. That is, when the openings of the jet holes 132 in one of the jet hole groups are inclined toward the first end of the shaft body 13, the openings of the jet holes 132 in the other of the jet hole groups are inclined at the same angle toward the second end of the shaft body 13. Force acting surfaces each corresponding to one of the two jet hole groups are provided on the mounting sleeve 121, and the force acting surfaces are each perpendicular to the axes of the jet holes 132 on the corresponding side. The air flows ejected by the two jet hole groups act on the mounting sleeve 121 to produce two forces, and the components of the two forces along the axial direction of the mounting sleeve 121 are equal in magnitude but opposite in direction, so that the air flows ejected by the jet holes 132 not only realize the radial positioning of the rotary vibration member 12, but also realize the axial positioning of the rotary vibration member 12.

Referring to FIG. 2, in an embodiment of the present application, only one group of annularly distributed jet holes 132 are provided and the axis of each of the jet holes 132 is along the radial direction of the shaft body 13, so that the length of the jet holes 132 is minimum and the pressure loss of the air flows passing through the jet holes 132 is also smaller, which is more conducive to maintaining the pressure of the air flows ejected by the jet holes 132.

Figure 4:
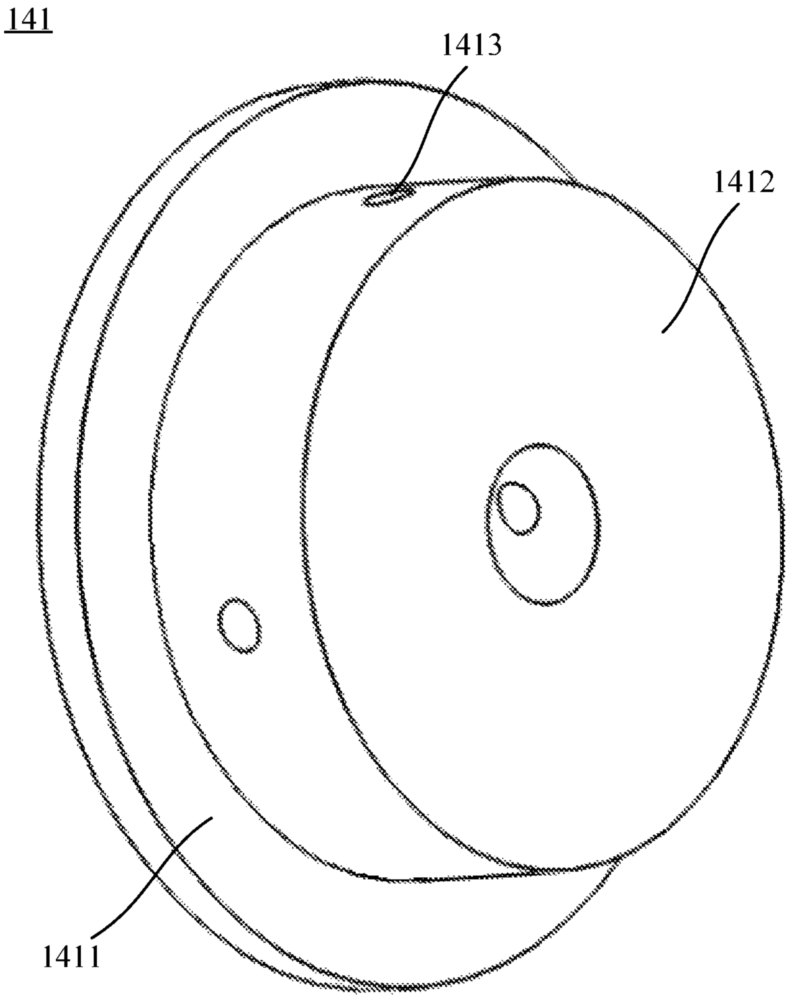
FIG. 4 is a schematic structural diagram of an air inlet end cover in the ultrasonic generation device provided by an embodiment of the present application.

To form air flows conducive to the rotation of the rotary vibration member 12 in the housing 11, referring to FIG. 2 and FIG. 4, in an embodiment of the present application, an air inlet assembly 14 is provided at the first end of the shaft body 13. That is, the air inlet assembly 14 is disposed at the end of the housing 11 where the air inlet 111 is provided. The air inlet assembly 14 includes an air inlet end cover 141, the first end of the shaft body 13 is inserted into the air inlet end cover 141, a first air guide hole 1413 is provided in the air inlet end cover 141, and the first air guide hole 1413 communicates the main air passage 131 with the air inlet 111 of the housing 11.

It should be noted that the ends of the housing 11 can be closed or open to facilitate the assembly of various components in the housing 11. Referring to FIG. 2, in an embodiment of the present application, the two ends of the housing 11 are open, so that the air inlet assembly 14, the rotary vibration member 12, and other components can be put in and assembled from the ends of the housing 11.

The shape of the air inlet end cover 141 is not limited in the present application. Referring to FIG. 4, in an embodiment of the present application, the air inlet end cover 141 is in the shape of a boss with a sealing portion 1411 on one end having a larger radial section and an air guide portion 1412 on the other end having a smaller radial section. The periphery of the sealing portion 1411 is attached to the inner wall of the housing 11 to seal the first end of the housing 11, the air guide portion 1412 of the air inlet end cover 141 is disposed close to the rotary vibration member 12, and the first air guide hole 1413 is provided at the periphery of the air guide portion 1412.

Figure 5:
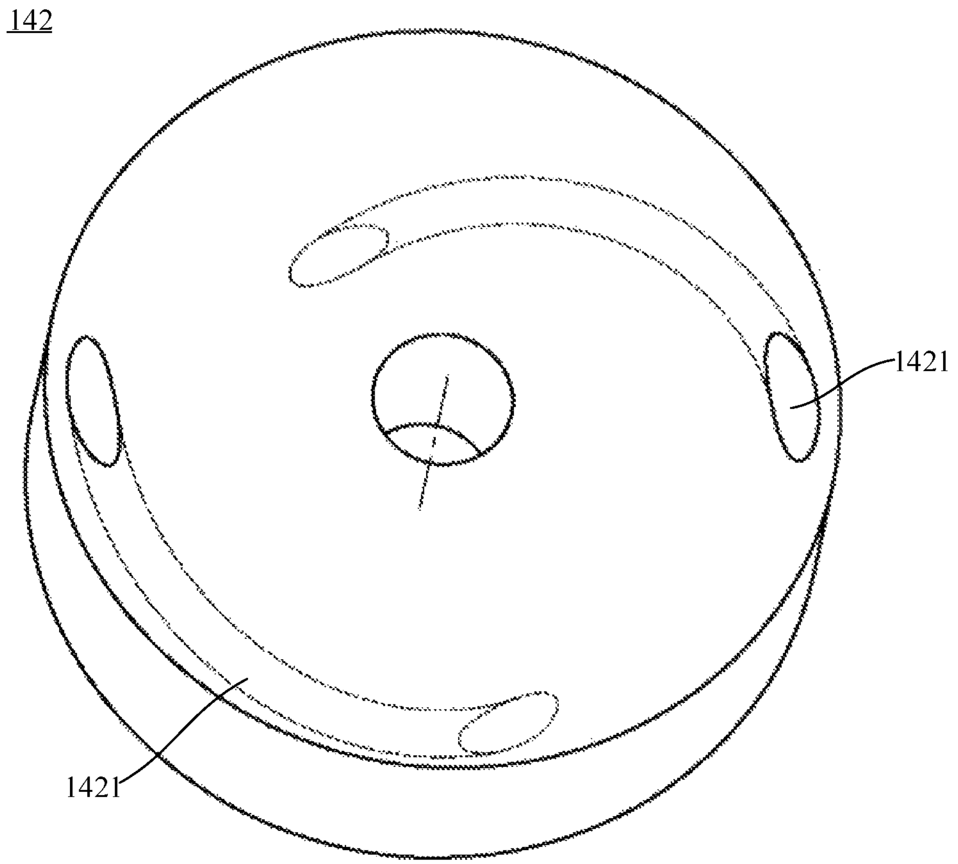
FIG. 5 is a schematic three-dimensional structural diagram of a guide ring in the ultrasonic generation device provided by an embodiment of the present application.
Figure 6:
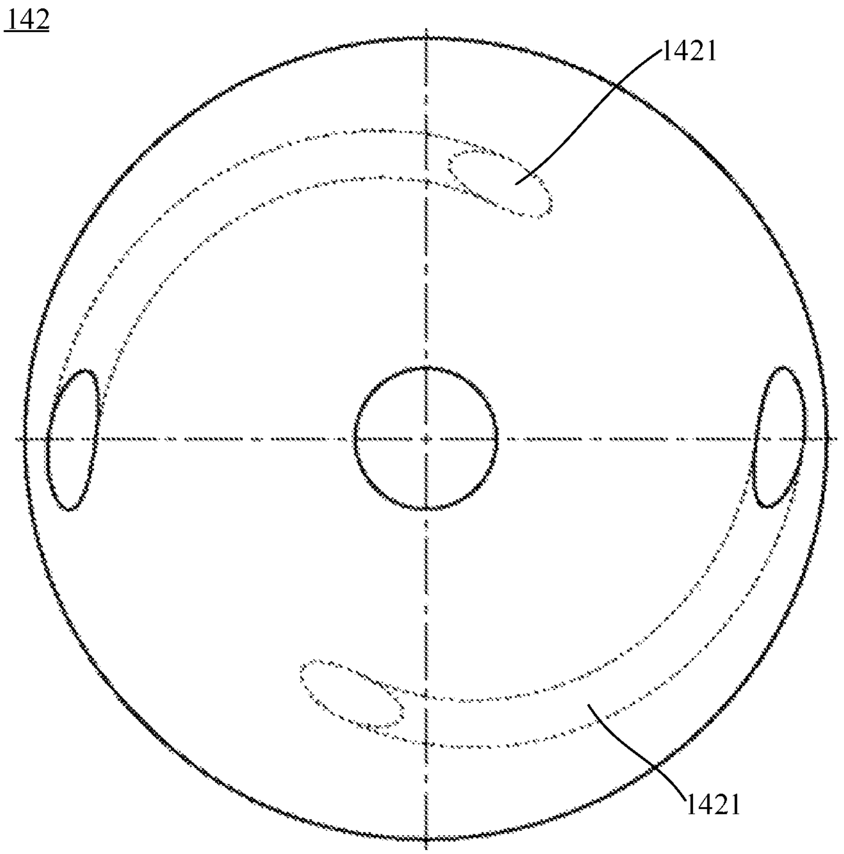
FIG. 6 is a schematic diagram of an end of the guide ring in the ultrasonic generation device provided by an embodiment of the present application.
Figure 7:
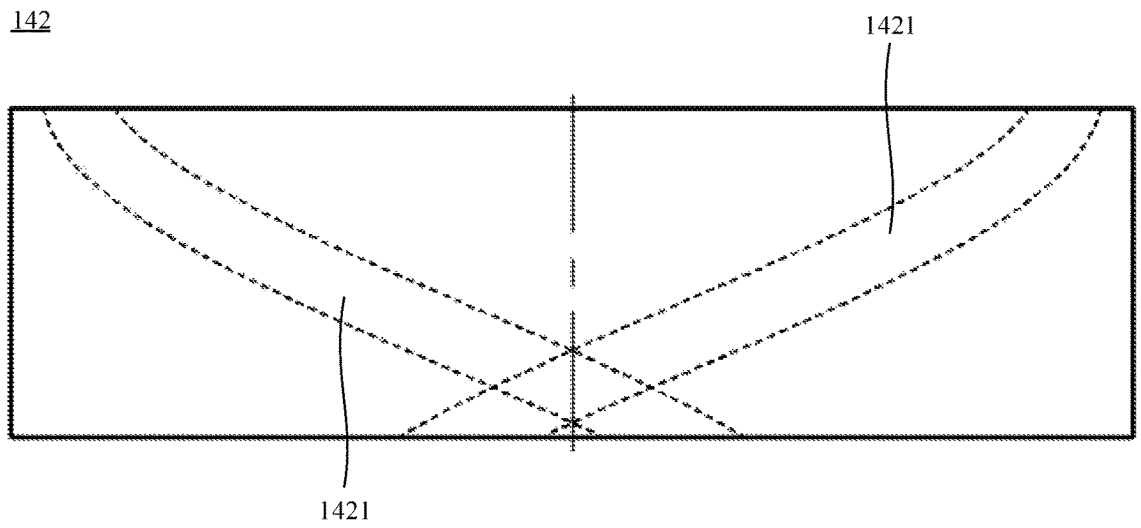
FIG. 7 is a schematic diagram along the periphery of the guide ring in the ultrasonic generation device provided by an embodiment of the present application.
Figure 8:
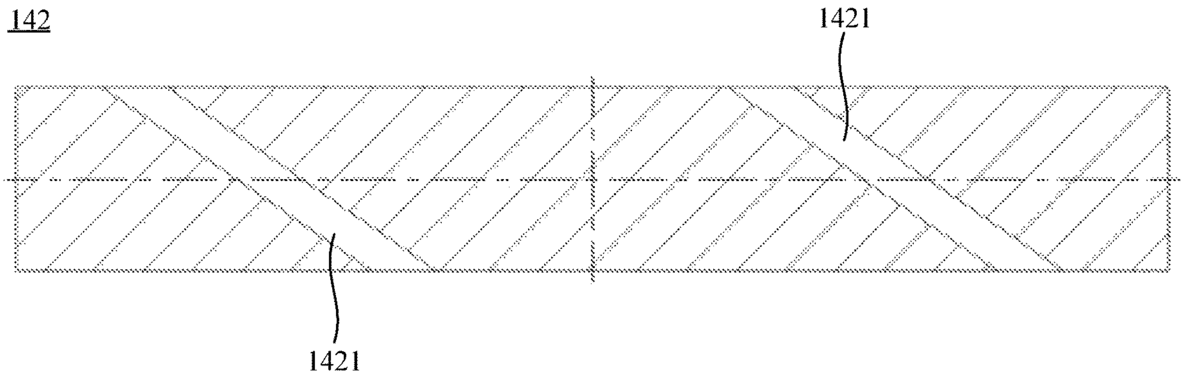
FIG. 8 is a schematic sectional view of the guide ring in the ultrasonic generation device provided by an embodiment of the present application.

Referring to FIG. 2 and FIG. 5, in an embodiment of the present application, the air inlet assembly 14 further includes a guide ring 142, the guide ring 142 is disposed on a side of the air inlet end cover 141 close to the rotary vibration member 12, a second air guide hole 1421 is provided in the guide ring 142, and the second air guide hole 1421 guides the air flow from the air inlet 111 to the rotary vibration member 12, to push the rotary vibration member 12 to rotate.

To facilitate guiding the air flow from the air inlet 111 into the first air guide hole 1413 and the second air guide hole 1421, referring to FIG. 2, in an embodiment of the present application, an annular first airflow passage 15 is formed between the air inlet end cover 141 and the inner wall of the housing 11. Specifically, the first airflow passage 15 is defined by the sealing portion 1411 of the air inlet end cover 141, the air guide portion 1412 of the air inlet end cover 141, the housing 11, and the guide ring 142. The first air guide hole 1413 and the second air guide hole 1421 are in communication with the air inlet 111 via the first airflow passage 15.

To make the guide ring 142 generate more air flows, referring to FIG. 5 to FIG. 8, in an embodiment of the present application, a plurality of second air guide holes 1421 are provided and are arranged in a circular array about the central axis of the guide ring 142, so that air flows are generated toward the rotary vibration member 12 and the elastic blades 122 of the rotary vibration member 12 are forced to vibrate. For example, two second air guide holes 1421 are provided.

To make air flows from the second air guide holes 1421 blow vertically to the elastic blades 122, referring to FIG. 5 to FIG. 8, in an embodiment of the present application, the two ends of each of the second air guide holes 1421 are respectively provided on two side surfaces of the guide ring 142, and each of the second air guide holes 1421 extends helically along the axial direction of the guide ring 142. That is, the two second air guide holes 1421 are each arranged at an angle with the generatrix of the guide ring 142, so that the air flows pass through the second air guide holes 1421 and blow vertically to the elastic blades 122, which ensures the vibration frequency and rotation speed of the rotary vibration member 12 and achieves the most effective use of the air flows in the second air guide holes 1421.

Since the air inlet 111 is provided on a side of the first airflow passage 15, the airflow speeds in the first airflow passage 15 are not even. To obtain even airflow speeds in the first airflow passage 15, referring to FIG. 1 and FIG. 4, in an embodiment of the present application, a plurality of first air guide holes 1413 are provided and are evenly distributed along the circumference of the air inlet end cover 141.

For example, four first air guide holes 1413 are provided and are in cross-shaped distribution along the radial directions of the air guide portion 1412. The air inlet 111 is aligned with one of the first air guide holes 1413, so that the first air guide hole 1413 is in communication with the main air passage 131 and air flows everywhere in the first airflow passage 15 to obtain even airflow speeds.

To realize the axial positioning of the shaft body 13, referring to FIG. 2, in an embodiment of the present application, a pressure-retaining assembly 16 is provided at the second end of the shaft body 13, and the pressure-retaining assembly 16 is configured for balancing the air pressure on two sides of the rotary vibration member 12 to realize the axial positioning of the rotary vibration member 12.

Specifically, the pressure-retaining assembly 16 includes a pressure-retaining exhaust ring 161, the periphery of the pressure-retaining exhaust ring 161 is connected to the inner wall of the housing 11, the pressure-retaining exhaust ring 161 is sleeved on the shaft body 13, and a second airflow passage 1611 is formed between the pressure-retaining exhaust ring 161 and the shaft body 13. The air flows passing through the elastic blades 122 will be hindered from flowing toward the pressure-retaining exhaust ring 161, and reverse air flows are produced to balance the air flows on two sides of the rotary vibration member 12. Meanwhile, the second airflow passage 1611 is provided to enable air outflow, which not only ensures that the air flows in a certain direction, but also creates back pressure for axial positioning of the rotary vibration member 12.

It should be noted that the method of fixing the pressure-retaining exhaust ring 161 to the housing 11 is not limited in the present application. For example, the pressure-retaining exhaust ring 161 can be fixed in the housing 11 by clamping, bonding, or welding. Referring to FIG. 2, in an embodiment of the present application, a plurality of positioning holes are provided in the housing 11 at positions corresponding to the pressure-retaining exhaust ring 161, and a connector 162 is provided in each of the positioning holes to fix the housing 11 and the pressure-retaining exhaust ring 161. The connectors 162 are positioning pins, screws, or the like which facilitate disassembly, assembly, and maintenance of the components.

The pressure-retaining assembly 16 further includes an elastic pressure-retaining plate 163. The elastic pressure-retaining plate 163 is disposed on a side of the pressure-retaining exhaust ring 161 away from the rotary vibration member 12. The elastic pressure-retaining plate 163 is sleeved on the shaft body 13 and is fixedly connected to the shaft body 13. The elastic pressure-retaining plate 163 is provided with elastic air outlets 1633, and the size of each of the elastic air outlets 1633 changes with the air pressure in the housing 11.

Figure 9:
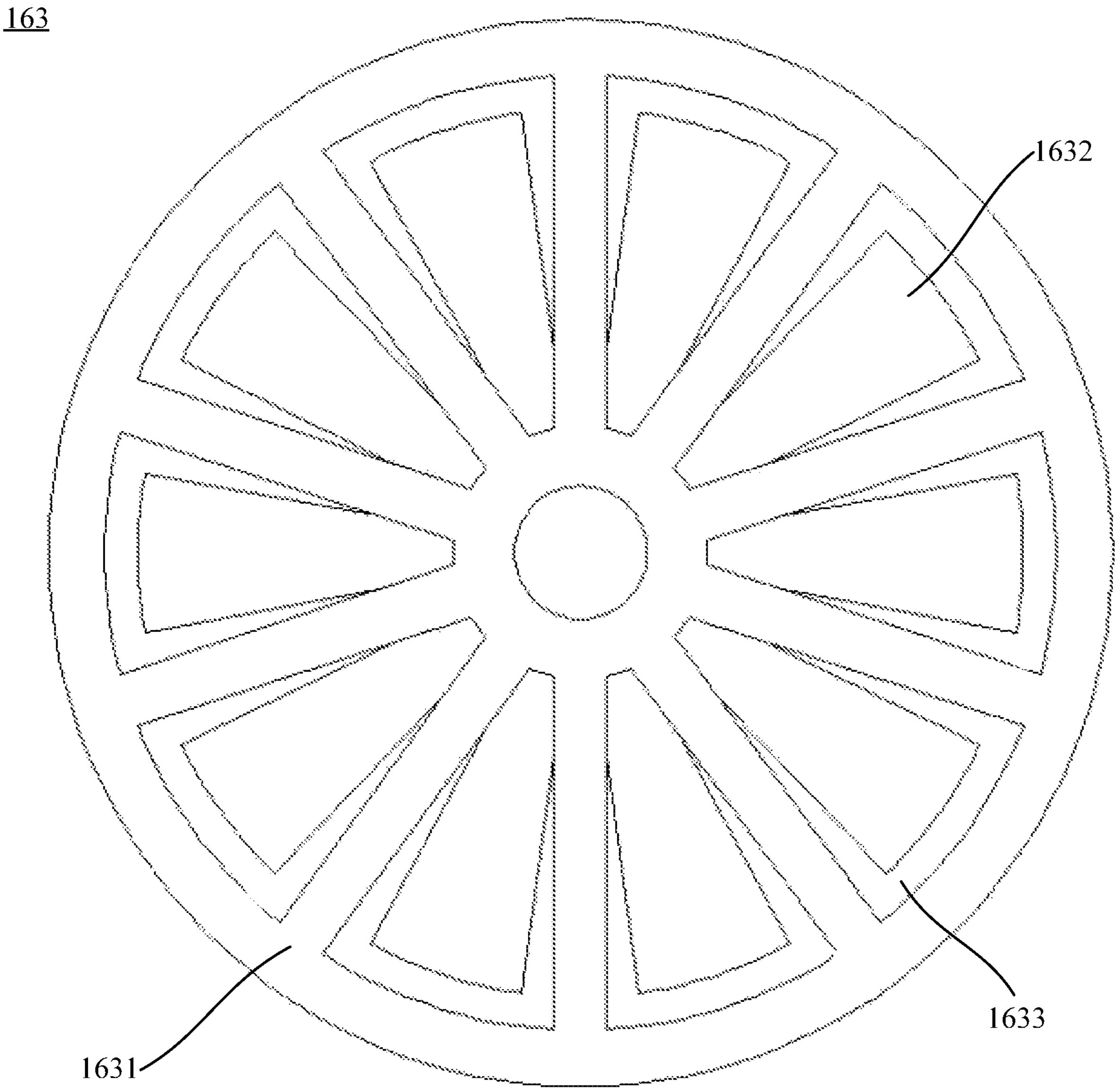
FIG. 9 is a schematic structural diagram of an elastic pressure-retaining plate in the ultrasonic generation device provided by an embodiment of the present application.

Referring to FIG. 9, in an embodiment of the present application, the elastic pressure-retaining plate 163 is disc-shaped and includes a pressure-retaining plate body 1631 connected to the shaft body 13. A plurality of elastic portions 1632 are provided on the pressure-retaining plate body 1631. The elastic air outlets 1633 are formed by the gaps between the elastic portions 1632 and the pressure-retaining plate body 1631. The elastic portions 1632 are strip-shaped and each have a free end away from the shaft body 13. When the air flows pass through the second airflow passage 1611 and arrive at the elastic pressure-retaining plate 163, the air flows apply certain pressure on the elastic portions 1632. When the air pressure increases, the pressure causes deformation of the elastic portions 1632, and the elastic portions 1632 protrude toward the airflow direction to increase the area of the elastic air outlets 1633. When the pressure decreases, the elastic portions 1632 rely on their own elasticity to return to the initial state, and the area of the elastic air outlets 1633 decreases accordingly. Therefore, the elastic pressure-retaining plate 163 is adapted to the airflow pressure and stable back pressure is generated, so that the pressure-retaining assembly 16 ensures the balance of the air pressure on two sides of the rotary vibration member 12 no matter when the air pressure is small or large.

Figure 10:
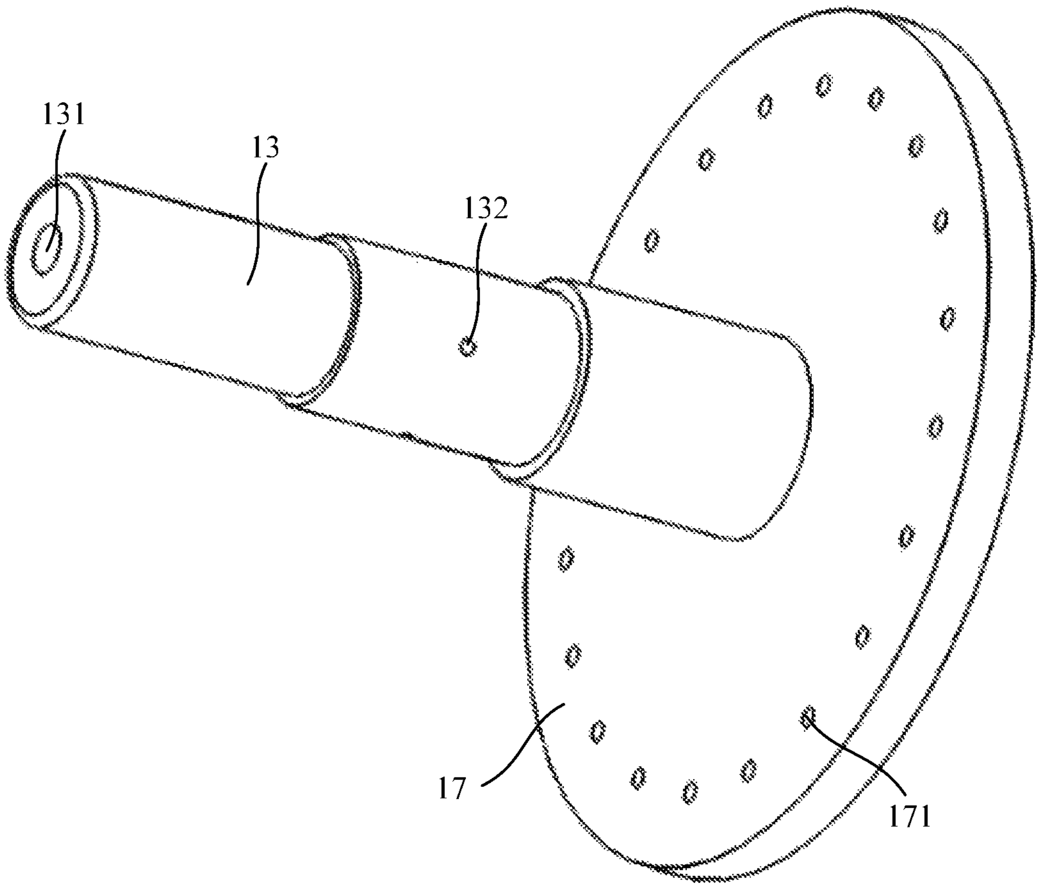
FIG. 10 is a schematic structural diagram of a shaft body and a silencer end cover in the ultrasonic generation device provided by an embodiment of the present application.

To reduce the noise caused by vibration of the ultrasonic generation device 1, referring to FIG. 2 and FIG. 10, in an embodiment of the present application, a silencer end cover 17 is further provided. The silencer end cover 17 is disposed on a side of the elastic pressure-retaining plate 163 away from the pressure-retaining exhaust ring 161. The silencer end cover 17 is fixedly connected to the housing 11 and is provided with a plurality of third air guide holes 171. The third air guide holes 171 are arranged in a circumferential array about the central axis of the silencer end cover 17, so that the air flows are finally guided to the outside of the housing 11 via the third air guide holes 171.

It should be noted that the method of fixing the silencer end cover 17 to the housing 11 is not limited in the present application. Referring to FIG. 2, in an embodiment of the present application, an elastic stop ring 18 is provided on a side of the silencer end cover 17 away from the rotary vibration member 12. The elastic stop ring 18 is clamped on the inner side of the housing 11 and the silencer end cover 17 is urged against the elastic stop ring 18. Correspondingly, an elastic stop ring 18 can also be provided on a side of the air inlet end cover 141 away from the rotary vibration member 12, and the air inlet end cover 141 is positioned in a similar way.

The shape of the shaft body 13 is not limited in the present application. Referring to FIG. 2 and FIG. 10, in an embodiment of the present application, the shaft body 13 is a three-section stepped shaft. The first section of the shaft body 13 has a larger diameter and cooperates with the pressure-retaining exhaust ring 161 and the elastic pressure-retaining plate 163 in the pressure-retaining assembly 16. The second section of the shaft body 13 has a moderate diameter, and it is provided with the jet hole 132 and cooperates with the rotary vibration member 12. The third section of the shaft body 13 has a smaller diameter, and it cooperates with the guide ring 142 and extends into the air inlet end cover 141. The second end of the shaft body 13 can be fixed to the silencer end cover 17 or can be integrated with the silencer end cover 17.

Figure 11:
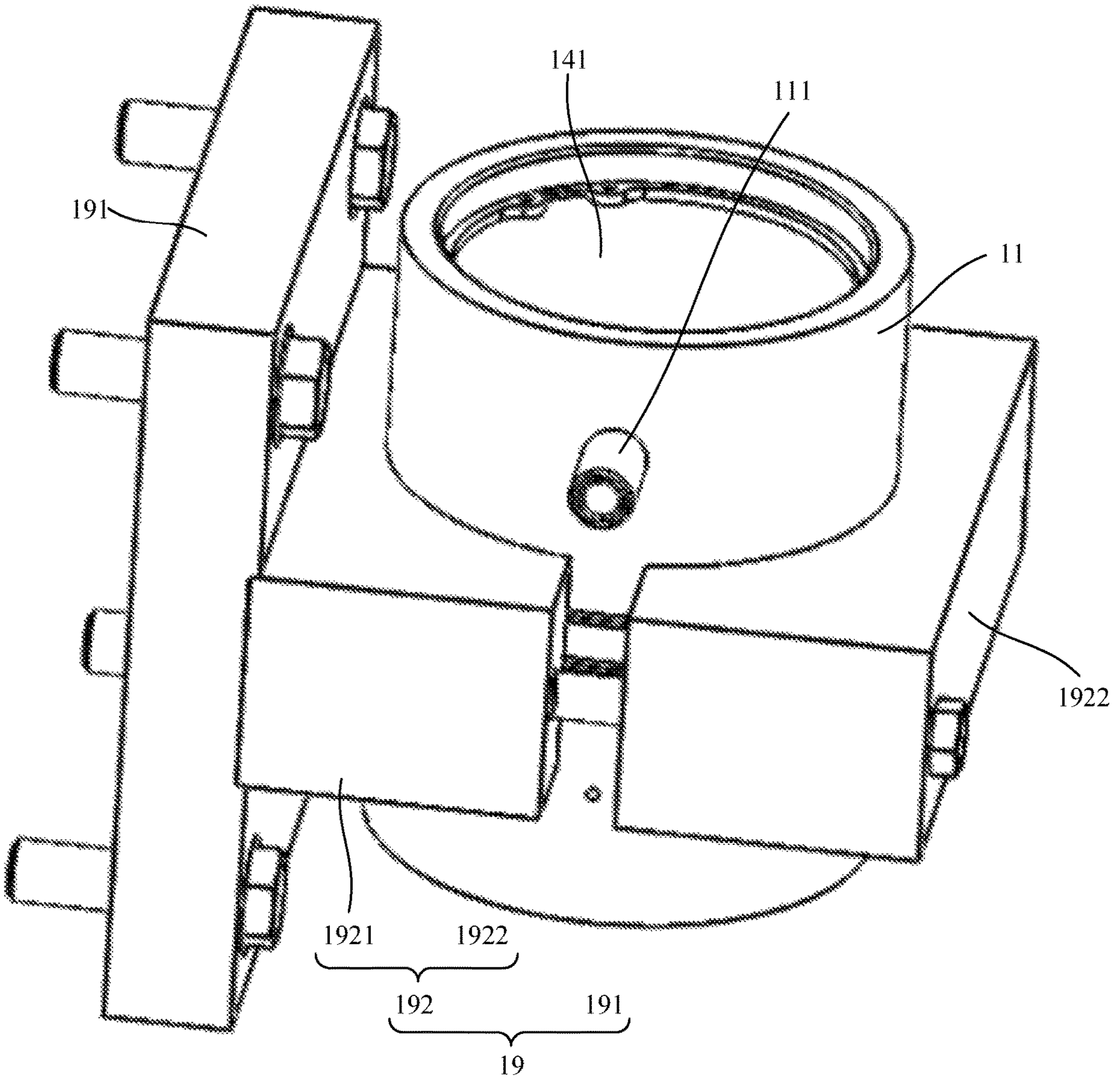
FIG. 11 is a schematic structural diagram of a mounting base in the ultrasonic generation device provided by an embodiment of the present application.

On this basis, to facilitate the installation of the ultrasonic generation device 1 on the concrete mixer 2, referring to FIG. 11, in an embodiment of the present application, the ultrasonic generation device 1 further includes a mounting base 19. The mounting base 19 includes a fixed bottom plate 191 and a movable hoop 192, the housing 11 is clamped in the movable hoop 192, and the fixed bottom plate 191 can be fixed to the concrete mixer 2 by bolts or other fasteners. The movable hoop 192 includes a fixed block 1921 and a movable block 1922 interlocked with each other. The fixed block 1921 is fixedly connected to the fixed bottom plate 191. The movable block 1922 and the fixed block 1921 each have one end hinged together and the other end connected via fasteners. To facilitate the clamping of the housing 11 and the movable hoop 192, groove-shaped fixing portions 112 are provided at the periphery of the housing 11, and protrusions matching with the fixing portions 112 are provided at corresponding positions on the movable block 1922 and the fixed block 1921 to limit the housing 11 in the movable hoop 192 in the axial direction.

In the ultrasonic generation device 1 and the concrete forming system of the present application, since the shaft body 13 on which the rotary vibration member 12 is sleeved is provided with the jet hole 132 in communication with the air inlet 111 and the jet hole 132 eject an air flow to form an air film between the rotary vibration member 12 and the shaft body 13, the friction between the rotary vibration member 12 and the shaft body 13 is reduced, the wear of the components is reduced, and the service life of the device is increased.

The sequence numbers of the above embodiments of the present application are merely for the convenience of description and do not imply the preference among the embodiments. The above descriptions are merely preferred embodiments of the present application and are not intended to limit the scope of the present application. Any equivalent changes in structure or process that are made based on the content of the specification and the accompanying drawings of the present application and are directly or indirectly used in other related technical fields shall fall within the protection scope of the present application.

INDUSTRIAL APPLICABILITY

In the ultrasonic generation device and the concrete forming system according to the embodiments of the present application, the jet hole in communication with the air inlet on the housing is provided to form an air film between the rotary vibration member and the shaft body, so that the friction between the rotary vibration member and the shaft body is reduced, the wear of the components is reduced, and the service life of the device is increased.

What is claimed is:

1. An ultrasonic generation device, comprising:

a housing, provided with an air inlet;

a rotary vibration member, disposed in the housing and configured for vibrating during a rotation to generate ultrasonic waves; and a shaft body, relatively fixed to the housing, wherein the rotary vibration member is sleeved on the shaft body, the rotary vibration member and the shaft body are rotatable relative to each other, the shaft body is provided with a main air passage and a plurality of jet holes, a first end of the main air passage is in communication with the air inlet and a second end of the main air passage is in communication with the plurality of jet holes, the plurality of jet holes are provided in the shaft body at a position corresponding to the rotary vibration member, and the plurality of jet holes are configured for ejecting an air flow to form an air film between the rotary vibration member and the shaft body, wherein the plurality of jet holes are evenly distributed along a circumference of the shaft body, wherein an axis of each of the plurality of jet holes is along a radial direction of the shaft body, wherein an air inlet assembly is provided at a first end of the shaft body, the air inlet assembly comprises an air inlet end cover, the first end of the shaft body is inserted into the air inlet end cover, a first air guide hole is provided in the air inlet end cover, and the first air guide hole communicates the main air passage with the air inlet of the housing, wherein a guide ring is disposed on a side of the air inlet end cover close to the rotary vibration member, a second air guide hole is provided in the guide ring, and the second air guide hole guides the air flow from the air inlet to the rotary vibration member, to push the rotary vibration member to rotate.

2. The ultrasonic generation device according to claim 1, wherein an annular first airflow passage is formed between the air inlet end cover and an inner wall of the housing, and the first air guide hole and the second air guide hole are in communication with the air inlet via the first airflow passage.

3. The ultrasonic generation device according to claim 2, wherein a plurality of second air guide holes are provided and the plurality of second air guide holes are arranged in a circular array about a central axis of the guide ring.

4. The ultrasonic generation device according to claim 3, wherein two ends of each of the second air guide holes are respectively provided on two side surfaces of the guide ring, and each of the second air guide holes extends helically along an axial direction of the guide ring.

5. The ultrasonic generation device according to claim 4, wherein a plurality of first air guide holes are provided and the plurality of first air guide holes are evenly distributed along a circumference of the air inlet end cover.

6. A concrete forming system, comprising:

a concrete mixer;

the ultrasonic generation device according to claim 1, disposed on the concrete mixer and configured for vibration forming of a concrete in the concrete mixer; and an air supply device, for providing the ultrasonic generation device with a purified air.

7. An ultrasonic generation device, comprising:

a housing, provided with an air inlet;

a rotary vibration member, disposed in the housing and configured for vibrating during a rotation to generate ultrasonic waves; and a shaft body, relatively fixed to the housing, wherein the rotary vibration member is sleeved on the shaft body, the rotary vibration member and the shaft body are rotatable relative to each other, the shaft body is provided with a main air passage and a plurality of jet holes, a first end of the main air passage is in communication with the air inlet and a second end of the main air passage is in communication with the plurality of jet holes, the plurality of jet holes are provided in the shaft body at a position corresponding to the rotary vibration member, and the plurality of jet holes are configured for ejecting an air flow to form an air film between the rotary vibration member and the shaft body, wherein the plurality of jet holes are evenly distributed along a circumference of the shaft body, wherein an axis of each of the plurality of jet holes is along a radial direction of the shaft body, wherein an air inlet assembly is provided at a first end of the shaft body, the air inlet assembly comprises an air inlet end cover, the first end of the shaft body is inserted into the air inlet end cover, a first air guide hole is provided in the air inlet end cover, and the first air guide hole communicates the main air passage with the air inlet of the housing, wherein a pressure-retaining assembly is provided at a second end of the shaft body, and the pressure-retaining assembly is configured for balancing air pressure on two sides of the rotary vibration member to realize axial positioning of the rotary vibration member.

8. The ultrasonic generation device according to claim 7, wherein the pressure-retaining assembly comprises a pressure-retaining exhaust ring, a periphery of the pressure-retaining exhaust ring is connected to an inner wall of the housing, the pressure-retaining exhaust ring is sleeved on the shaft body, and a second airflow passage is formed between the pressure-retaining exhaust ring and the shaft body.

9. The ultrasonic generation device according to claim 8, wherein an elastic pressure-retaining plate is disposed on a side of the pressure-retaining exhaust ring away from the rotary vibration member, the elastic pressure-retaining plate is sleeved on the shaft body and is fixedly connected to the shaft body, the elastic pressure-retaining plate is provided with elastic air outlets, and a size of each of the elastic air outlets changes with the air pressure in the housing.

* * * * *